United States Patent
VanBuskirk et al.

(10) Patent No.: US 10,023,294 B2
(45) Date of Patent: Jul. 17, 2018

(54) TAIL SPAR SPRING

(71) Applicant: Bell Helicopter Textron Inc., Fort Worth, TX (US)

(72) Inventors: Matthew Carl VanBuskirk, Euless, TX (US); Michael Scott Seifert, Southlake, TX (US); Michael Christopher Burnett, Fort Worth, TX (US); Mark Loring Isaac, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 216 days.

(21) Appl. No.: 14/747,205

(22) Filed: Jun. 23, 2015

(65) Prior Publication Data

US 2016/0039515 A1 Feb. 11, 2016

Related U.S. Application Data

(60) Provisional application No. 62/034,211, filed on Aug. 7, 2014.

(51) Int. Cl.
| | |
|---|---|
| *B64C 5/02* | (2006.01) |
| *B64C 1/26* | (2006.01) |
| *B64C 5/10* | (2006.01) |
| *B64C 29/00* | (2006.01) |

(52) U.S. Cl.
CPC ............... *B64C 5/02* (2013.01); *B64C 1/26* (2013.01); *B64C 5/10* (2013.01); *B64C 29/0033* (2013.01)

(58) Field of Classification Search
CPC .... B64C 5/02; B64C 5/10; B64C 1/26; B64C 29/0033
See application file for complete search history.

(56) References Cited

U.S. PATENT DOCUMENTS

| | | | |
|---|---|---|---|
| 2,580,176 A | * | 12/1951 | Johnson ............... B64C 5/06 244/87 |
| 2,708,081 A | | 5/1955 | Dobson |
| 3,039,719 A | | 6/1962 | Platt |

(Continued)

FOREIGN PATENT DOCUMENTS

FR 2281875 A1 3/1976

OTHER PUBLICATIONS

Communication Under Rule 71(3) EPC in related European Patent Application No. 15177693.7, dated Oct. 5, 2016, 26 pages.

(Continued)

*Primary Examiner* — Timothy D Collins
*Assistant Examiner* — Keith L Dixon

(57) ABSTRACT

According to one embodiment, an empennage attachment system features an aft attachment mechanism and a forward attachment system. The aft attachment mechanism is configured to be coupled to a tail section of a body of an aircraft and to an empennage proximate to an aft spar of the empennage. The aft attachment mechanism defines a pitch axis such that the aft attachment mechanism allows the empennage to rotate about the pitch axis. The forward attachment system is configured to be coupled to the tail section of the body and to the empennage proximate to a forward spar of the empennage. The forward attachment system is configured to restrict rotation of the empennage about the pitch axis to an allowable range of motion.

25 Claims, 7 Drawing Sheets

(56) References Cited

U.S. PATENT DOCUMENTS

| | | | |
|---|---|---|---|
| 3,166,271 A | | 1/1965 | Zuck |
| 4,247,061 A | * | 1/1981 | Kuczynski ................ B64C 1/26 244/17.11 |
| 5,096,143 A | * | 3/1992 | Nash ........................ B64C 5/10 244/46 |
| 5,395,073 A | * | 3/1995 | Rutan .................... B64C 3/385 244/38 |
| 5,549,260 A | * | 8/1996 | Reed, III .................. B64C 5/10 244/174 |
| 7,581,696 B2 | * | 9/2009 | Morgan .................... B64C 5/02 244/45 R |
| 8,006,932 B2 | * | 8/2011 | Honorato Ruiz ......... B64C 1/26 244/87 |
| 8,342,446 B2 | * | 1/2013 | Chareyre .................. B64C 5/18 244/87 |
| 9,174,731 B2 | * | 11/2015 | Ross .................... B64C 29/0033 |
| 9,376,206 B2 | * | 6/2016 | Ross .................... B64C 29/0033 |
| 9,616,995 B2 | * | 4/2017 | Watkins .................. B64C 27/24 |
| 2010/0032519 A1 | | 2/2010 | Chareyre |
| 2010/0148000 A1 | | 6/2010 | Llamas |

OTHER PUBLICATIONS

Search Report in related European Application No. 15183762.2, dated Nov. 19, 2015, 3 pages.
Communication Pursuant to Article 94(3) EPC in related European Application No. 15177693.7, dated Jun. 14, 2016, 5 pages.
Examination Report in related European Application No. 15183762.2, dated Jan. 13, 2016, 7 pages.

* cited by examiner

TAIL SPAR SPRING

RELATED APPLICATIONS

Pursuant to 35 U.S.C. § 119 (e), this application claims priority to U.S. Provisional Patent Application Ser. No. 62/034,211, entitled ROTORCRAFT TAIL SPAR SPRING, filed Aug. 7, 2014. U.S. Provisional Patent Application Ser. No. 62/034,211 is hereby incorporated by reference.

GOVERNMENT RIGHTS

At least some of the subject matter of this application may have been made with government support under W911W6-13-2-0001 awarded by the United States Army under the Future Vertical Lift program. The government may have certain rights in the invention.

TECHNICAL FIELD

This invention relates generally to aircraft tails, and more particularly, to a tail spar spring.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to achieve global reduction in oscillatory loads and vibration in an aircraft. Teachings of certain embodiments recognize the ability to react to critical tail fin loads while allowing for axial motion to tailor aircraft dynamic tuning.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
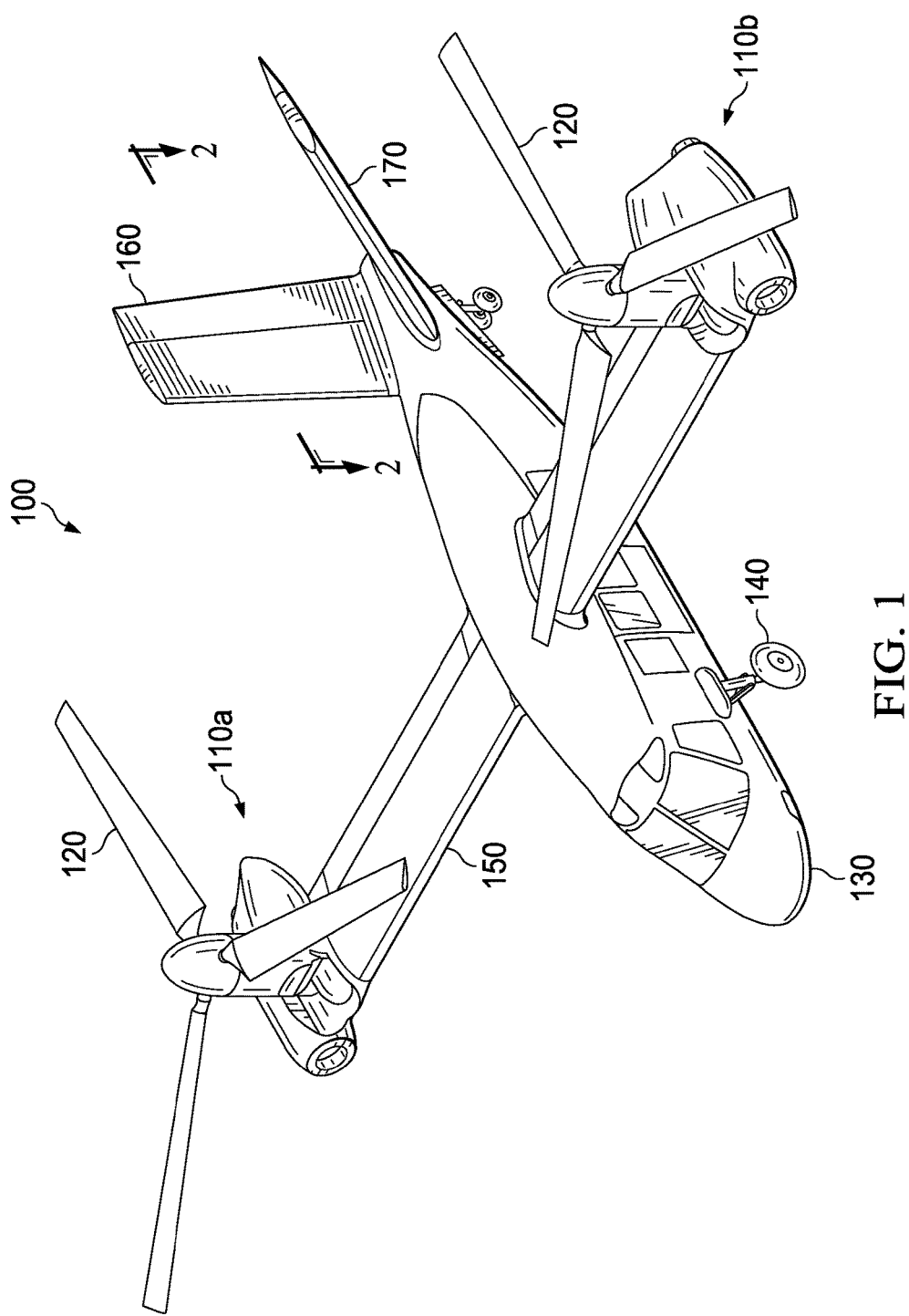
FIG. 1 shows a tiltrotor aircraft according to one example embodiment.

FIG. 1 shows a rotorcraft 100 according to one example embodiment. Rotorcraft 100 features rotor systems 110a and 110b, blades 120, a fuselage 130, a landing gear 140, a wing 150, and an empennage 160.

Rotor system 110 may rotate blades 120. Rotor system 110 may include a control system for selectively controlling the pitch of each blade 120 in order to selectively control direction, thrust, and lift of rotorcraft 100. In the example of FIG. 1A, rotorcraft 100 represents a tiltrotor aircraft, and rotor systems 110a and 110b feature rotatable nacelles. In this example, the position of nacelles 110a and 110b, as well as the pitch of rotor blades 120, can be selectively controlled in order to selectively control direction, thrust, and lift of tiltrotor aircraft 100.

Fuselage 130 represents the main body of rotorcraft 100 and may be coupled to rotor system 110 (e.g., via wing 150) such that rotor system 110 and blades 120 may move fuselage 130 through the air. Landing gear 140 supports rotorcraft 100 when rotorcraft 100 is landing and/or when rotorcraft 100 is at rest on the ground.

Teachings of certain embodiments relating to rotor systems described herein may apply to rotor system 110 and/or other rotor systems, such as non-tilting rotor and helicopter rotor systems. It should also be appreciated that teachings from rotorcraft 100 may apply to aircraft other than rotorcraft, such as airplanes and unmanned aircraft, to name a few examples.

In the example of FIG. 1, tiltrotor aircraft 100 may operate in a helicopter mode by tilting the nacelles upright and in an airplane mode by tilting the nacelles forward. Tiltrotor aircraft 100 may generate greater forward speed in airplane mode than in helicopter mode because, in airplane mode, blades 120 are oriented to generate greater thrust propelling the aircraft forward (somewhat analogous to a propeller).

Rotorcraft 100 also features at least one empennage 160. Empennage 160 represents a flight control surface coupled to the tail portion of fuselage 130. In the example of FIG. 1, rotorcraft 100 features two empennages 160. In this example embodiment, the combination of the two empennages 160 may represent a v-tail configuration.

Figure 2:
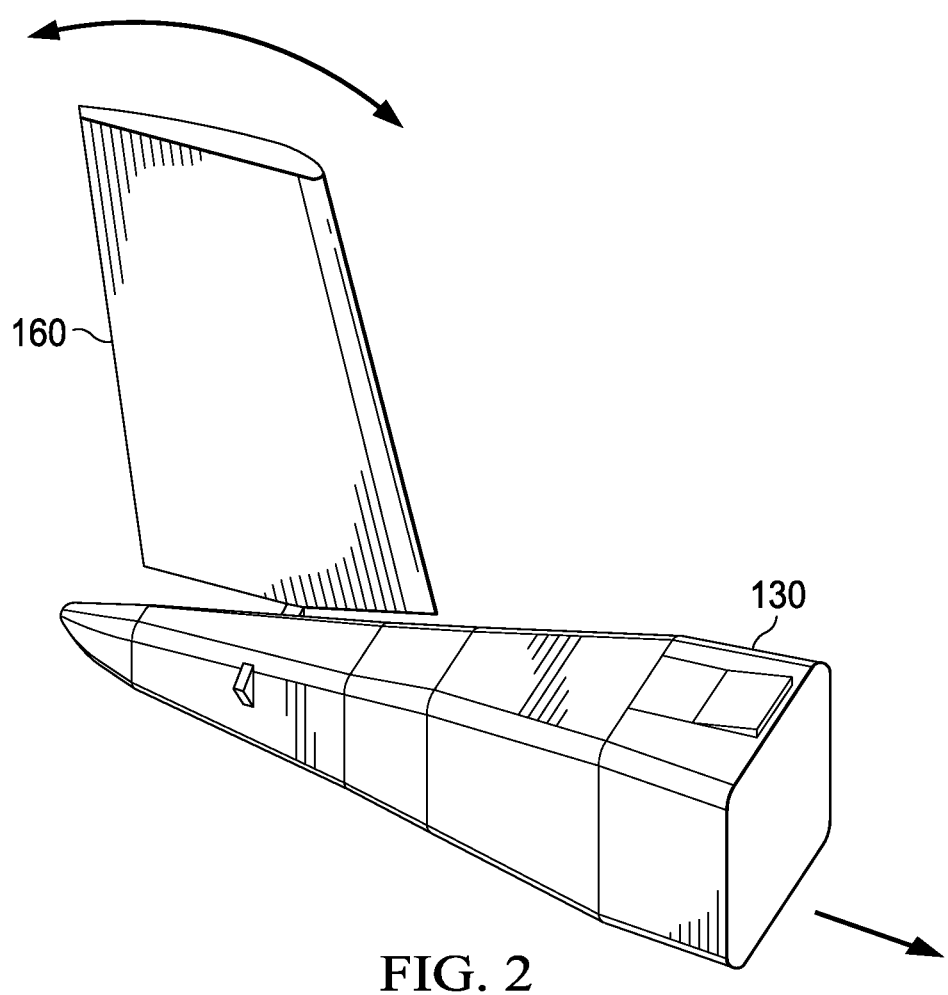
FIG. 2 shows a closer view of the fuselage and one empennage of the tiltrotor aircraft of FIG. 1.

FIG. 2 shows a closer view of fuselage 130 and one empennage 160 of rotorcraft 100 according to one example embodiment. During operation of rotorcraft 100, empennage 160 may be subject to a variety of forces, including a force against empennage 160 in the chordwise direction, as seen in the example of FIG. 2.

Teachings of certain embodiments recognize the capability to reduce stiffness of empennage 160 in the chordwise direction while still maintaining the strength of empennage 160 in other directions. Teachings of certain embodiments also recognize the capability to achieve global reduction in oscillatory loads and vibration. Teachings of certain embodiments recognize the ability to react to critical tail fin loads while allowing for axial motion to tailor aircraft dynamic tuning.

Some example embodiments may provide axial compliance to the vertical tail of a tiltrotor aircraft to tailor airframe dynamic tuning and thus achieve large global reductions in oscillatory loading and vibration. Some tiltrotor aircraft may be sensitive to the contributions of the tail vertical surfaces to the overall dynamic response of a tilt rotor aircraft. For example, stiffness of the tail joint may have a large impact on vibrations such as 3/rev vibrations. Accordingly, vibration modes may be improved by decoupling the tail vibration modes from the fuselage bending modes. Teachings of certain embodiments recognize that softening the tail joint connection may allow the airframe vibration mode to be moved away from the 3/rev position.

Teachings of certain embodiments recognize the capability to improve airframe (and particular tail section) design as compared to tuning methods for dynamic tuning of fundamental aircraft loads, such as stiffening airframe structures or adjusting mass distribution. Such tuning methods may involve intrusive design medications, which may be prohibitive to NRE cost and schedule. Additionally, stiffening of airframe structures for dynamic tuning of fundamental airframe modes may result in tremendous weight impacts. Redistribution of masses to achieve meaningful dynamic tuning of fundamental fuselage modes may also not be feasible without the use of dedicated tuning masses, which also involves added parasitic weight.

Figure 3:
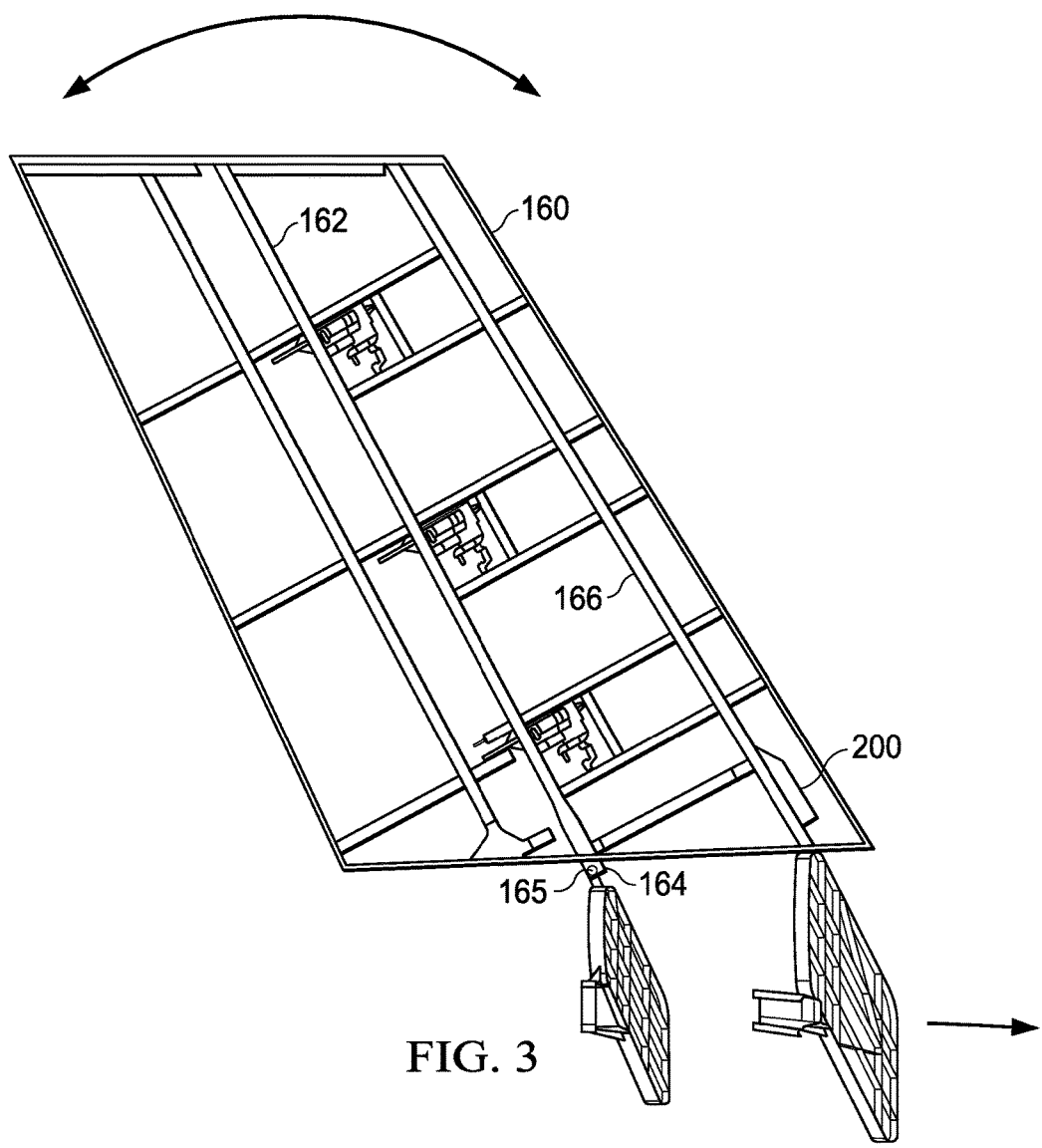
FIG. 3 shows an internal plan view of the empennage of FIG. 2 according to one example embodiment.

FIG. 3 shows an internal plan view of empennage 160 according to one example embodiment. As seen in the example of FIG. 3, empennage 160 features an aft spar 162 and a forward spar 166. Aft spar 162 is attached to fuselage 130 via an aft attachment mechanism 164. Forward spar 166 is attached to fuselage 130 via a forward attachment system 200.

Aft attachment mechanism 164 is coupled to fuselage 130 and to empennage 160 proximate to aft spar 162. In the example of FIG. 3, aft attachment mechanism 164 defines a pitch axis 165 such that aft attachment mechanism 164 allows empennage 160 to rotate about pitch axis 165. In one example embodiment, aft attachment mechanism 164 comprises an elongated pin defining the pitch axis and a receiver portion coupled at least partially about the elongated pin and configured to rotate about the elongated pin.

As seen in the example of FIG. 3, pitch axis 165 extends into and out of the page and is oriented perpendicular to the plan view of empennage 160. Teachings of certain embodiments recognize that aft attachment mechanism 164 may allow empennage 160 to rotate forward and aft in response to the forces in the chordwise direction discussed above with regard to FIG. 2.

Forward attachment system 200 is coupled to fuselage 130 and to empennage 160 proximate to forward spar 166. As will be explained in greater detail below, forward attachment system 200 is configured to restrict rotation of empennage 160 about pitch axis 165 to an allowable range of motion.

Figure 4:
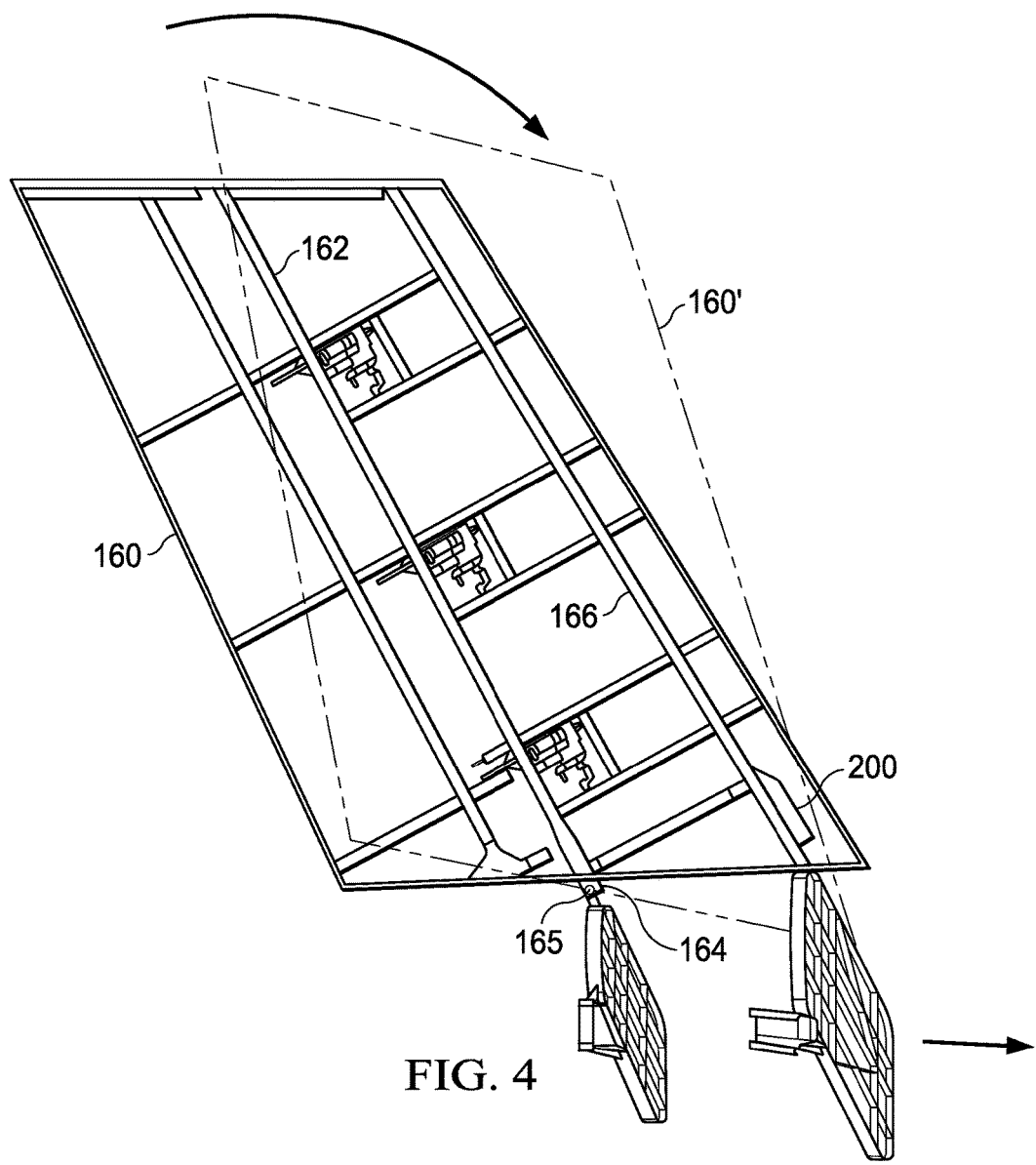
FIG. 4 shows movement of the empennage of FIG. 3 in the forward/aft direction according to one example embodiment.

FIG. 4 shows movement of empennage 160 in the forward/aft direction according to one example embodiment. In the example of FIG. 4, empennage 160 has rotated forward about pitch axis 165 to a new empennage position 160'. As seen in this example, however, rotating empennage 160 about pitch axis 165 changes the distance between forward spar 166 and fuselage 130. Accordingly, teachings of certain embodiments recognize the capability to restrict rotation of empennage 160 about pitch axis 165 to an allowable range of motion and to provide structural support to empennage 160.

Figure 5:
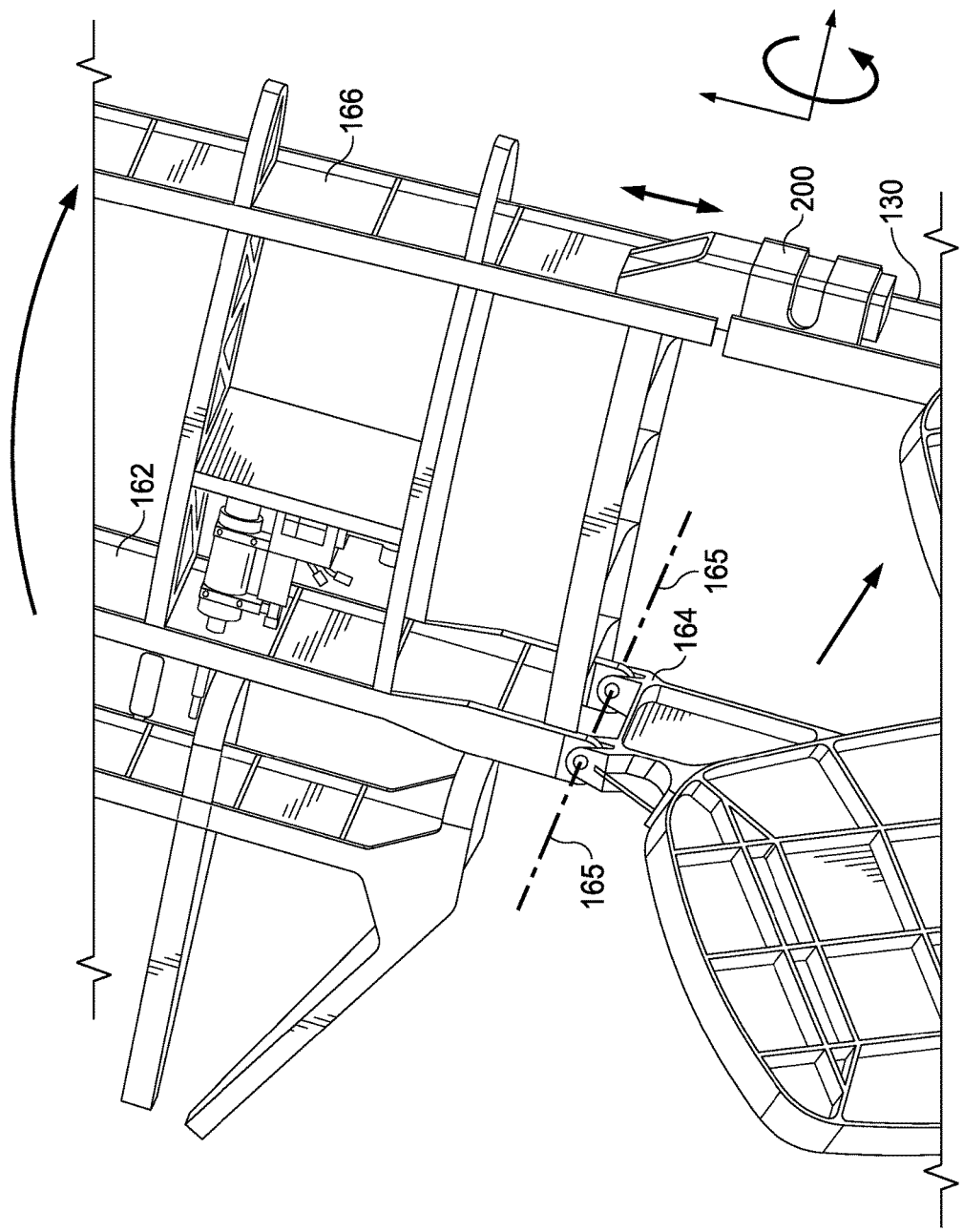
FIG. 5 shows a perspective view of a forward attachment system installed on the empennage of FIG. 3 according to one example embodiment.
Figure 6B:
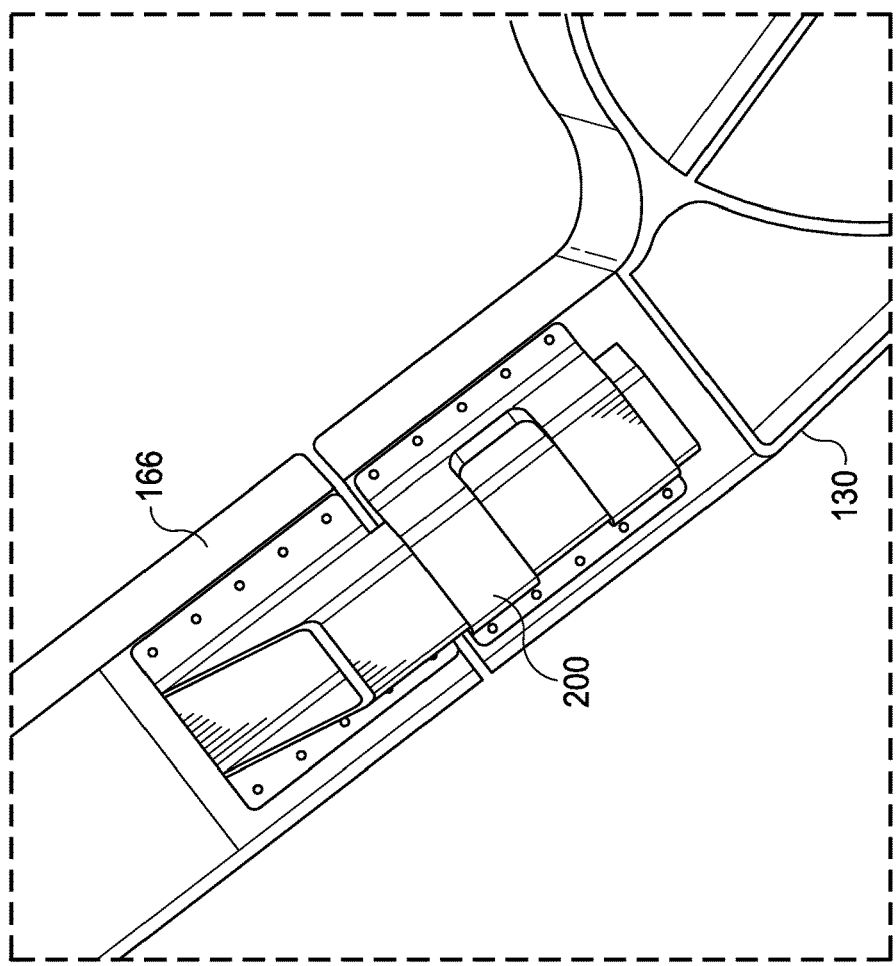
FIG. 6B shows a side view of the forward attachment system of FIG. 5 installed between the forward spar of the empennage and the fuselage of FIG. 6A according to one example embodiment.
Figure 6A:
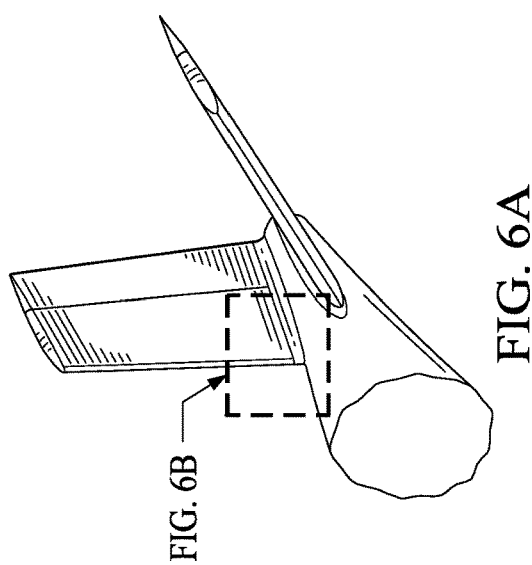
FIG. 6A shows a perspective view of the empennage of FIG. 3 installed on the fuselage of FIG. 1 according to one example embodiment.

FIG. 5 shows a perspective view of forward attachment system 200 installed on empennage 160, and FIG. 6 shows a side view of forward attachment system 200 installed between forward spar 166 and fuselage 130 according to one example embodiment. In the example of FIGS. 5 and 6, forward attachment system 200 provides axial softness in the span direction and beamwise stiffness in rotation about the chord direction. As will be explained in greater detail below, however, this axial softness in the span direction is not without limitation; rather, forward attachment system 200 may restrict some movement in the span direction so as to restrict rotation of empennage 160 about pitch axis 165 to an allowable range of motion.

Figure 7A:
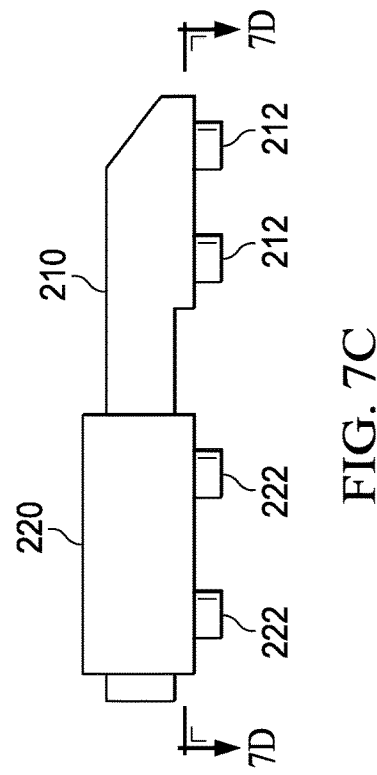
FIGS. 7A-7D show various views of the forward attachment system of FIG. 5 according to one example embodiment.

FIGS. 7A-7D show forward attachment system 200 according to one example embodiment. FIG. 7A shows a side view of forward attachment system 200 attached between forward spar 166 and fuselage 130. In this example embodiment, forward attachment system 200 features an inner member 210, an outer member 220, and pads 230. Inner member 210 is configured to slide within outer member 220, and pads 230 restrict movement of inner member 210 relative to outer member 220. In the example of FIG. 7A, inner member 210 is coupled to forward spar 166, and outer member 220 is coupled to fuselage 130; in other embodiments, however, outer member 220 may be coupled to forward spar 166, and inner member 210 may be coupled to fuselage 130.

Figure 7B:
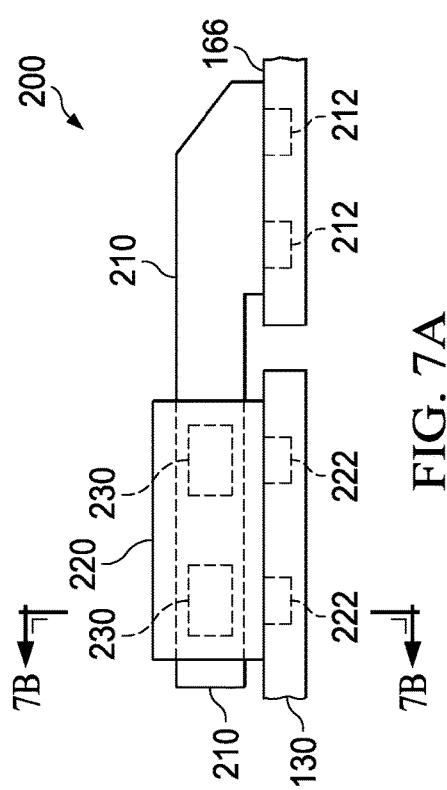

FIG. 7B shows a cross-section of forward attachment system 200 featuring two of pads 230 secured between inner member 210 and outer member 220. In the example of FIGS. 7A and 7B, four pads are provided—two on each side of inner member 210. Pads 230 may be secured between inner member 210 and outer member 220 in a variety of manners. In one example embodiment, pads 230 are bonded to both inner member 210 and outer member 220. Teachings of certain embodiments recognize that bonding pads 230 to both inner member 210 and outer member 220 may prevent over-rotation of empennage 160 by restricting rotation of empennage 160 about pitch axis 165 to an allowable range of motion. In this example embodiment, pads 230 may also restrict movement of inner member 210 relative to outer member 220 in other directions, such as preventing inner member 210 from directly contacting outer member 220.

Pads 230 may be made of any variety of materials, such as elastomer materials, silicone, composite, metal flexure, or any other suitable material. Elastomeric material may include any material, such as a polymer, that has the property of viscoelasticity (colloquially, "elasticity"). An example of an elastomeric material is rubber. Elastomeric materials generally have a low Young's modulus and a high yield strain when compared to other materials. Elastomeric materials are typically thermosets having long polymer chains that cross-link during curing (i.e., vulcanizing). Elastomeric materials may absorb energy during compression but may also be prone failure during tension and torsion.

Although inner member 210 appears to be coaxially aligned inside outer member 220 in FIGS. 7A and 7B, teachings of certain embodiments recognize that inner member 210 may not move perfectly along a line coaxial with void within outer member 220. In particular, because empennage 160 rotates about pitch axis 165 defined by aft attachment mechanism 164 and because inner member 210 is located a distance away from pitch axis 165, inner member 210 should actually travel along a circumferential path relative to pitch axis 165. Principles of geometry require that this circumferential path be curved. Accordingly, inner member 210 moves along a curved path within outer member 220, not along a straight line within outer member 220.

Teachings of certain embodiments recognize that, although empennage 160 may rotate relative to pitch axis 165, forward attachment system 200 may be configured such that inner member 210 and outer member 220 move substantially axially relative to each other. Although inner member 210 may move on a circumferential path, it may behave as if it travels in an axial path. Such a configuration may be accomplished, for example, by locating and orienting pads 230 so as to minimize any additional stiffening due to motion in a circumferential path and by selecting axial stiffness to limit chordwise rotation (e.g., limiting chordwise rotation to more than 0.25 degrees). Teachings of certain embodiments recognizing that configuring inner member 210 to behave as if it travels in an axial path may prevent forward attachment system 200 from being over-constrained, which would limit the amount of axial compliance available to tune the aircraft modes. Teachings of certain embodiments also recognize that configuring inner member 210 to behave as if it travels in an axial path may allow for improved aircraft tuning by altering only one stiffness direction (e.g., the axial motion direction).

In some embodiments, hard stops may be provided to restrict inner member 210 from moving too far relative to outer member 220, or stated another way, to restrict movement of these components to a certain range of motion. Teachings of certain embodiments recognize that restricting movement of inner member 210 relative to outer member 220 may also lengthen the operating lives of pads 230. For example, pads 230 may be made of an elastomeric material, and many elastomeric materials perform well in compression but poorly in tension and/or shear. Accordingly, when one pad 230 compresses to restrict further rotation of empennage 160, this action also prevents over-tension or over-shear of the other pads 230.

Figure 7C:
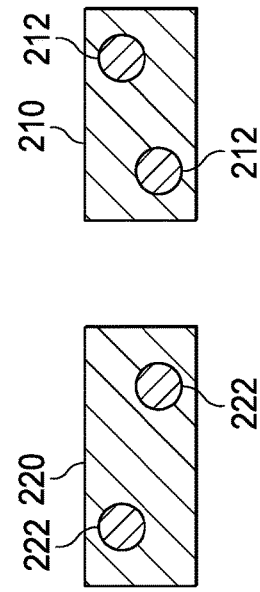
Figure 7D:
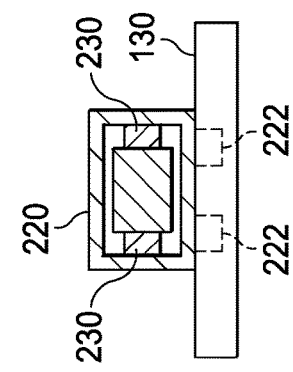

FIG. 7C shows front attachment system 200 removed from forward spar 166 and fuselage 130, and FIG. 7D shows a cross-section view of front attachment system 200. In the example of FIGS. 7A-7D, inner member 210 features bosses 212, and outer member 220 features bosses 222. Teachings of certain embodiments recognize that features such as bosses 212 and 222 may allow force to be transferred between inner member 210 and forward spar 166 and between outer member 222 and fuselage 130. In the example of FIGS. 7A-7D, the four bosses are substantially cylindrical, but other embodiments may feature bosses of other shapes, sizes, or quantities.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A tiltrotor aircraft, comprising:
    a body;
    a wing member;
    a power train coupled to the body and comprising a power source and a drive shaft in mechanical communication with the power source;
    a plurality of rotor blades comprising a first rotor blade, a second rotor blade, and a third rotor blade;
    a rotor system coupled to the wing member and in mechanical communication with the drive shaft, at least part of the rotor system being tiltable between a helicopter mode position and an airplane mode position;
    an empennage, the empennage comprising an aft spar and a forward spar;
    an aft attachment mechanism coupled to a tail section of the body and to the empennage proximate to the aft spar, the aft attachment mechanism defining a pitch axis such that the aft attachment mechanism allows the empennage to rotate about the pitch axis; and
    a forward attachment system coupled to the tail section of the body and to the empennage proximate to the forward spar, the forward attachment system configured to restrict rotation of the empennage about the pitch axis to an allowable range of motion, the forward attachment system comprising:
        an outer member;
        an inner member disposed at least partially within the outer member; and
        at least one pad configured to restrict the movement of the inner member relative to the outer member.

2. The tiltrotor of claim 1, wherein the aft attachment mechanism comprises an elongated pin defining the pitch axis and a receiver portion coupled at least partially about the elongated pin and configured to rotate about the elongated pin.

3. The tiltrotor of claim 1, wherein the at least one pad is comprised of a material selected from the group consisting of elastomer materials, silicone, and composite materials.

4. The tiltrotor of claim 1, wherein the at least one pad is an elastomer material bonded to both the inner member and to the outer member.

5. The tiltrotor of claim 1, wherein the at least one pad is disposed between the inner member and the outer member such that the at least one pad prevents the inner member from contacting the outer member.

6. The tiltrotor of claim 1, wherein the inner member is coupled to the forward spar, and the outer member is coupled to the fuselage.

7. The tiltrotor of claim 1, wherein the inner member is configured to travel along a curved path within the outer member.

8. The tiltrotor of claim 7, wherein an inner chamber of the outer member is symmetrical about a straight-line axis, and the curved path passes through the inner chamber.

9. An aircraft, comprising:
    a body;
    an empennage, the empennage comprising an aft spar and a forward spar;
    an aft attachment mechanism coupled to a tail section of the body and to the empennage proximate to the aft spar, the aft attachment mechanism defining a pitch axis such that the aft attachment mechanism allows the empennage to rotate about the pitch axis; and a forward attachment system coupled to the tail section of the body and to the empennage proximate to the forward spar, and configured to restrict rotation of the empennage about the pitch axis to an allowable range of motion, the forward attachment system comprising:
an outer member;
an inner member disposed at least partially within the outer member; and
at least one pad configured to restrict the movement of the inner member relative to the outer member.

10. The aircraft of claim 9, wherein the aft attachment mechanism comprises an elongated pin defining the pitch axis and a receiver portion coupled at least partially about the elongated pin and configured to rotate about the elongated pin.

11. The aircraft of claim 9, wherein the at least one pad is comprised of a material selected from the group consisting of elastomer materials, silicone, and composite materials.

12. The aircraft of claim 9, wherein the at least one pad is an elastomer material bonded to both the inner member and to the outer member.

13. The aircraft of claim 9, wherein the at least one pad is disposed between the inner member and the outer member such that the at least one pad prevents the inner member from contacting the outer member.

14. The aircraft of claim 9, wherein the outer member is coupled to the forward spar, and the inner member is coupled to the fuselage.

15. The aircraft of claim 9, wherein the inner member is configured to travel along a curved path within the outer member.

16. The aircraft of claim 15, wherein an inner chamber of the outer member is symmetrical about a straight-line axis, and the curved path passes through the inner chamber.

17. An empennage attachment system, comprising:
an aft attachment mechanism configured to be coupled to a tail section of a body of an aircraft and to an empennage proximate to an aft spar of the empennage, the aft attachment mechanism defining a pitch axis such that the aft attachment mechanism allows the empennage to rotate about the pitch axis; and
a forward attachment system coupled to the tail section of the body and to the empennage proximate to the forward spar, and configured to restrict rotation of the empennage about the pitch axis to an allowable range of motion, the forward attachment system comprising:
an outer member;
an inner member disposed at least partially within the outer member; and
at least one pad configured to restrict the movement of the inner member relative to the outer member.

18. An aircraft, comprising:
a body;
an empennage, the empennage comprising a first spar and a second spar;
a rotational attachment mechanism coupled to a tail section of the body and to the empennage proximate to the second spar, the rotational attachment mechanism defining a pitch axis such that the rotational attachment mechanism allows the empennage to rotate about the pitch axis; and
a limiting attachment system coupled to the tail section of the body and to the empennage proximate to the first spar, and configured to restrict rotation of the empennage about the pitch axis to an allowable range of motion, the limiting attachment system comprising:
an outer member;
an inner member disposed at least partially within the outer member; and
at least one pad configured to restrict the movement of the inner member relative to the outer member.

19. The aircraft of claim 18, wherein the rotational attachment mechanism comprises an elongated pin defining the pitch axis and a receiver portion coupled at least partially about the elongated pin and configured to rotate about the elongated pin.

20. The aircraft of claim 18, wherein the at least one pad is comprised of a material selected from the group consisting of elastomer materials, silicone, and composite materials.

21. The aircraft of claim 18, wherein the at least one pad is an elastomer material bonded to both the inner member and to the outer member.

22. The aircraft of claim 18, wherein the at least one pad is disposed between the inner member and the outer member such that the at least one pad prevents the inner member from contacting the outer member.

23. The aircraft of claim 18, wherein the inner member is coupled to the first spar, and the outer member is coupled to the fuselage.

24. The aircraft of claim 18, wherein the inner member is configured to travel along a curved path within the outer member.

25. The aircraft of claim 24, wherein an inner chamber of the outer member is symmetrical about a straight-line axis, and the curved path passes through the inner chamber.

* * * * *